United States Patent [19]

Grawunde

[11] 4,336,826
[45] Jun. 29, 1982

[54] CONTROL VALVE

[75] Inventor: Frederick G. Grawunde, Painesville, Ohio

[73] Assignee: Fluid Controls, Inc., Mentor, Ohio

[21] Appl. No.: 146,106

[22] Filed: May 2, 1980

[51] Int. Cl.³ .................... F16K 31/122; F16K 17/04
[52] U.S. Cl. ..................................... 137/540; 91/420; 251/63.4; 251/63.5
[58] Field of Search ................. 91/420; 137/493, 540; 251/28, 62, 63, 63.4, 63.5

[56]     References Cited
     U.S. PATENT DOCUMENTS

| | | | |
|---|---|---|---|
| 2,653,626 | 9/1953 | Finlayson | 91/420 |
| 3,665,810 | 5/1972 | Parrett | 91/420 |
| 3,792,715 | 2/1974 | Parrett et al. | 137/493 |
| 4,223,693 | 9/1980 | Kosarzecki | 91/420 |

OTHER PUBLICATIONS

Fluid Controls, Inc., "Cartridge Over Center Valves," Apr. 1979, p. 5.061; Mar. 1980, p. 5.063.

Primary Examiner—George L. Walton
Attorney, Agent, or Firm—Watts, Hoffmann, Fisher & Heinke Co.

[57]         ABSTRACT

A pilot-assisted pressure relief valve including a valve body 10 defining a first and second plurality of ports 30, 32 and an internal stepped bore 40 that slidably supports an elongate, tubular primary piston 34 engageable with a valve seat 36 mounted at one end of the valve body bore, which cooperate to control fluid communication between the first and second plurality of ports. The piston 34 is biased towards a flow interrupting position by a spring and is biased towards an open position by fluid pressure at the first plurality of ports. A pilot-operated piston 70 is mounted coaxially with the primary piston and is operative to engage the primary piston 34 and oppose the spring force thereby reducing the effective relief setting of the valve.

7 Claims, 2 Drawing Figures

CONTROL VALVE

DESCRIPTION

1. Technical Field

The present invention relates generally to flow control valves and in particular to pilot assisted pressure relief valves.

2. Background Art

Pilot-assisted pressure relief valves, often called over-center or holding valves, are used to control fluid flow to and from an actuator and to hydraulically lock the actuator in position when fluid flow is terminated. The valve prevents load induced "runaway" and provides a static overload relief function. Prior valves have also included a check valve section that allows flow to proceed unimpeded, from the source to the actuator but prevents fluid flow from the actuator to the source.

One common application for this type of valve is the control of fluid flow to an actuator used for operating a boom assembly. In order to raise the boom assembly, fluid is directed to the boom actuator via the check valve section of the pilot-assisted relief valve. As soon as flow terminates, the check valve operates to prevent return fluid flow from the actuator to the source and in this way the load is locked in position.

A presently available valve of this type comprises a valve body defining an internal bore that slidably supports an elongate piston. A spring loaded valve seat is mounted at one end of the valve body bore and is engageable with the piston. The piston and valve seat cooperate to control fluid flow between spaced ports formed in the valve body. A portion of the valve engaging end of the piston is exposed to fluid pressure present in one set of ports. This fluid pressure develops a force on the piston which urges it towards an open position, (i.e. away from the valve seat). An adjustable spring housed at the opposite end of the valve body opposes this fluid force and maintains piston closure until the fluid force exceeds the spring force and hence, determines the relief valve setting of the valve. Should an excessively high or overload pressure be encountered, the piston will move from its valve seat and allow fluid flow to the source until the pressure is reduced below the relief setting.

The piston includes an external shoulder that defines an effective pressure area to which a pilot pressure is applied by way of a pilot pressure passage formed in the valve body. The applied pilot pressure exerts a force on the primary piston in opposition to the spring force. By selectively applying the pilot pressure to this pressure area on the control piston, controlled opening of the valve can be achieved to allow fluid flow from the actuator to the source and thus, effect lowering of the boom assembly. If the pilot pressure flow is terminated, the piston will immediately reclose and prevent further flow from the actuator. Should the load begin to "run away," the primary piston will throttle or terminate the flow due to the reduced force on the effective pressure area defined on the valve engaging end of the piston.

Generally the effective pressure area defined by the piston shoulder is substantially larger than the effective pressure area defined on the valve engaging end of the piston so that relatively low pilot pressures can exert substantial forces and overcome the spring force. In the commercially available valve, the ratio between the pilot pressure area and the relief pressure area is in the order of 4:1. With this configuration, a 100 p.s.i. pilot pressure produces a force on the piston equivalent to that produced by a 400 psi fluid pressure on the valve seat engaging end of the piston. Put another way, a 100 psi pilot pressure reduces the effective relief setting of the valve by 400 psi.

For most applications, the present valve performed satisfactorily. It has been found, however, that in an application in which high system back pressures are encountered, the effective relief setting of the valve is disproportionately changed with increasing back pressure. Whenever the primary piston opens to allow flow between the ports, fluid fills the primary piston bore and the spring chamber in the valve. Should back pressure develop, the fluid in the piston bore and spring chamber will pressurize to the system back pressure and will exert a force on the spring end of the piston (which has a larger diameter than the flow controlling end). Due to the piston configuration, the system back pressure is amplified in the same ratio as pilot pressure. For the valve discussed above, a system back pressure of 100 psi will be manifested as a 400 psi increase in the relief setting of the valve.

DISCLOSURE OF INVENTION

The present invention provides a new and improved pilot assisted pressure relief valve in which fluid forces generated by system back pressure do not disproportionately increase the effective relief setting of the valve.

According to a preferred embodiment, the valve comprises a valve body, a primary piston slidably supported within the body, a valve seat engageable with the piston for controlling fluid flow between spaced ports formed in the valve body and a pilot pressure operated secondary piston for applying forces to the primary piston. The ports in the valve body preferably extend radially from an outer surface of the valve body to the internal bore and are arranged as a first and second plurality of ports, axially spaced from each other. An adjustable biasing arrangement, preferably a resilient compression spring acts between the primary piston and the valve body and urges the piston towards engagement with the valve seat.

The primary piston is tubular, includes a through bore and is slidably supported in an elongate, stepped bore defined by the valve body. The valve seat is mounted at one end of the valve body bore and to one side of the first set of ports. One end of the primary piston defines a valve seat engaging surface which when engaging the valve seat seals off communication between the first set of ports and the interior of the valve. The valve seat engaging end of the piston defines an effective pressure area exposed to fluid pressure at the first set of ports. Fluid at these ports develops a force on the primary piston urging it in a direction away from the valve seat.

A plurality of radial ports is formed in the primary piston spaced a predetermined distance from the valve seat engaging end of the piston and in substantial alignment with the second set of ports formed in the valve body. Whenever the piston disengages the valve seat, a flow path is formed wherein fluid flow can proceed from the first set of ports, through the interior of the piston, through the piston ports, and out the second set of radial ports formed in the valve housing.

According to the invention, a pilot operated secondary piston is also mounted within the valve body and is engageable with the primary piston. When pilot pressure is applied to the secondary piston, it engages and applies a force to the primary piston that urges it away from the valve seat. In effect, the secondary piston is operative to reduce the effective relief setting of the valve. In the absence of pilot pressure, the secondary piston disengages the primary piston. Because the secondary piston can only apply a force to the primary piston in one direction, any system backpressure applied to the secondary piston is not amplified or transferred to the primary piston. The system backpressure only acts to counter the force produced by the pilot pressure.

In a preferred construction, the end of the primary piston opposite the valve engaging end, defines a radial extending flange having a diameter larger than the rest of the piston. Clearance provided between the circumferential surface of the flange and the bore of the valve body communicates fluid pressure to both radial surface of the flange and thus the net fluid force on this flange is zero. This construction prevents system backpressure from being amplified by the spring end of the primary piston to produce a disproportionate increase in the relief valve setting as it did in the prior valve.

According to this preferred construction, the secondary piston is formed by a sleeve that is mounted concentrically about the primary piston, adjacent the radial flange. The sleeve is axially movable between the radial flange on the piston and a shoulder formed in the valve body that marks the transition from a large diameter bore portion to a narrow diameter bore portion. A passage is formed in the valve body for communicating fluid pressure to an area between the shoulder in the valve body and a confronting radial face of the sleeve. Whenever pilot pressure is communicated to this area, the sleeve moves axially until it abuts and contacts the radial flange formed on the primary piston, thereby applying a force to the piston in opposition to the force exerted by the relief spring. It should be apparent any force applied to the primary piston by the secondary piston will operate to reduce the effective relief valve setting the valve. As noted above, any system backpressure encountered will be applied directly to the secondary piston and reduce the force applied by the pilot pressure. By this construction, a disproportionate increase in the relief valve setting will not be produced by system backpressure.

In the preferred embodiment, the present invention is incorporated in a cartridge-type valve configuration to facilitate maintenance and inspection. Accordingly, the valve body includes a threaded portion by which the valve is screwed into a valve housing or valve manifold. A plurality of spaced, external O-rings are mounted at various locations on the valve body and sealingly engage the valve housing or manifold in which the valve body is mounted. A certain of the O-rings seal the valve body to the valve housing and prevent fluid leakage whereas other O-rings seal the first set of ports from the second set of ports.

According to an added feature of the invention, the valve seat is spring loaded and axially movable and provides a check valve function for the valve. Any pressurized fluid at the first set of ports is also applied to the movable valve seat and urges it into engagement with the valve engaging end of the primary piston and thus fluid flow from the first set of ports to the interior of the valve body is prevented until the primary piston moves away from the valve seat. If on the other hand, pressurized fluid is present at the second set of ports and is greater than any pressurized fluid at the first set of ports, the force of this pressurized fluid urges the valve seat out of engagement with the primary piston and fluid can flow from the second set of ports to the first set of ports substantially unimpeded.

These and other features as well as a fuller understanding of the invention will be obtained in reading the following description in connection with the accompanying drawings.

BEST MODE FOR CARRYING OUT THE INVENTION

Figure 1:
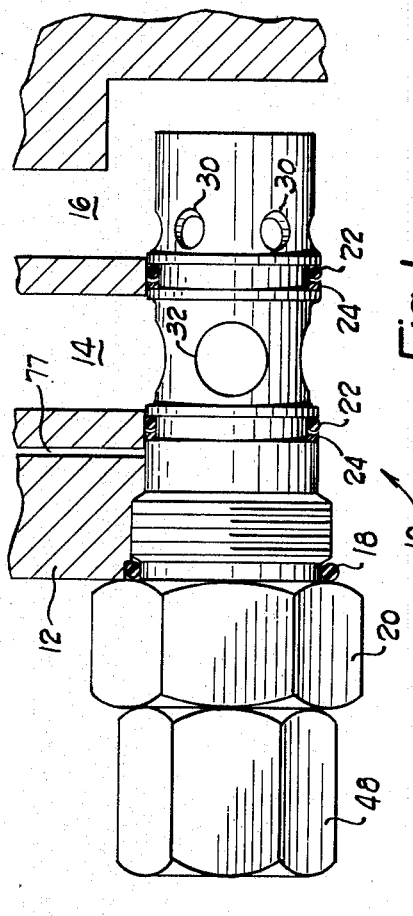
FIG. 1 is a side elevational view of a control valve constructed in accordance with the preferred embodiment of the invention; and, FIG. 2 is an enlarged cross-sectional view of the control valve illustrated in FIG. 1.

FIG. 1 illustrates the overall construction of a pilot-assisted pressure relief valve embodying the present invention. The valve shown is constructed in a cartridge configuration but the invention itself is adaptable to non-cartridge type valves. The valve includes an elongate valve body 10 adapted to threadably mount into a manifold or housing 12 (shown diagrammatically in FIG. 1) and when mounted extends between a pair of flow passages 14, 16. An O-ring seal 18 prevents fluid leakage between the valve body 10 and the housing 12. The valve body includes a hexagonal portion 20 shaped to receive an appropriate wrench to facilitate installation and tightening. A pair of O-rings 22 and associated teflon backup rings 24 are disposed in spaced grooves 26 on the valve body. The O-rings sealingly engage the housing 12 and seal off fluid communication between two adjacent sections 10a, 10b of the valve body 10.

The valve body section 10a communicates with the flow passage 16 and includes a plurality of radial ports 30. The section 10b communicates with the flow passage 14 and includes a plurality of ports 32.

Figure 2:
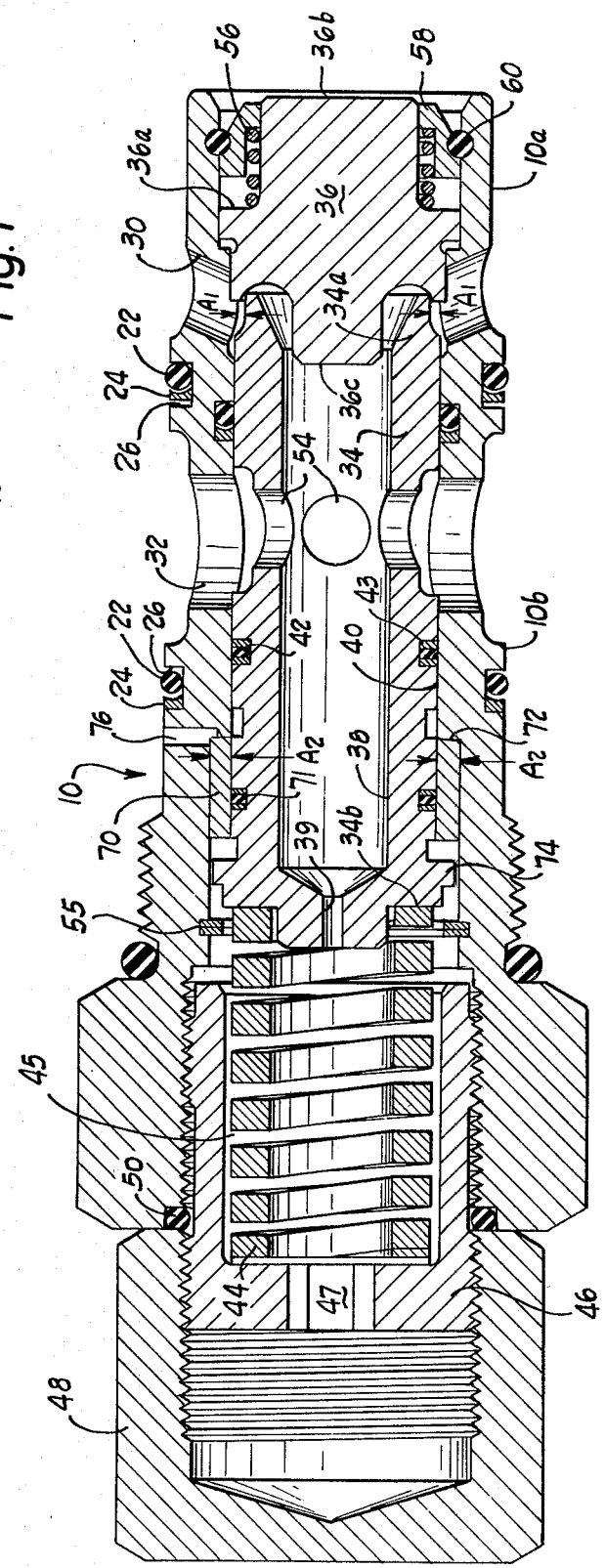

Fluid communication between the passages 14, 16 is controlled by a primary piston 34 and an associated valve seat 36 that are disposed in a flow path between the ports 30, 32. As seen in FIG. 2, the piston 34 is an elongate, tubular structure having a substantially uniform bore 38 that joins a smaller diameter end bore 39. The piston 34 is slidably supported in a multi-stepped bore 40 defined by the valve body 10. A seal ring 42 carried in a groove 43 formed in the piston 34 minimizes fluid leakage between the piston 34 and the valve body bore 40.

The valve seat 36 is annular and is mounted in the right end of the valve body bore 40 (as viewed in FIG. 2). The rightmost end 34a of the piston 34 defines a seat engaging surface and an effective pressure area $A_1$ that is exposed to fluid pressure in the ports 30. Fluid pressure impinging on the area $A_1$ establishes a force which urges the piston towards the left (as viewed in FIG. 1) and out of engagement with the seat 36. Countering this fluid force is a biasing spring 44 housed in a spring chamber 45 which acts between an adjustment plug 46 threadedly received by the valve body and a radial shoulder 34b formed on the left end of the piston 34. A hex-shaped aperture 47 formed in the plug 46 accepts a suitable adjusting implement for causing rotation of the plug. The axial position (relative to the valve body 10) of the adjustment plug 46 determines the spring preload on the piston 34. A cap 48 is threadedly received by the adjustment plug 46 and in conjunction with O-ring seal 50 prevents fluid leakage out of the valve body bore 40 and also locks the position of the adjustment plug 46.

It should be apparent that when the fluid force acting on the area $A_1$ of the piston 34 exceeds the force applied by the spring 44, a piston will move to the left away from the seat 36 and allow fluid flow from the ports 30 into the piston bore 38. A plurality of radial ports 54, spaced from the right end of the piston 34 and in substantial alignment with the valve body ports 32 provide a flow path for fluid from the piston bore 38 to the flow passage 14 in the housing 12. Thus whenever the piston 34 moves away from the seat 36, fluid flow from the ports 30 to the ports 32 can occur. As soon as the pressure at the port 30 is reduced so that the fluid force developed on the area $A_1$ is less than the spring force, the piston 34 will move to the right and re-engage the valve seat 36 and seal off communication between the ports 30, 32. A retaining ring 55 disposed in a groove machined into the bore 40 limits the leftward movement of the piston 34.

In the preferred construction, a valve seat 36 provides a check valve function and allows unimpeded fluid flow from the ports 32 to the ports 30. As seen in FIG. 2, the seat 36 is slidably mounted in the valve body bore 40 and is urged towards the left into engagement with a piston 34 by a concentric spring 56 that acts between a shoulder 36a formed in the seat 36 and a spring seat 58 that is held in the valve body bore 40 by a retaining ring 60 that co-engages grooves formed in the valve body bore 40 and the retainer 58. Referring also to FIG. 1, fluid pressure at the ports 30 also impinges on a surface 36b of the seat 36 establishing a force urging the seat 36 towards the left. It should be apparent that whenever fluid under pressure is present at the ports 30 a force is developed on the seat 36 that urges the seat into engagement with the piston 34. As long as the pressure of the fluid in the ports 30 is below the relief setting of the valve, the piston will sealingly engage the seat 36 and prevent fluid communication from the ports 30 to the ports 32. Conversely, should the pressure of fluid at the ports 32 be greater than at the ports 30 the fluid force developed on an internal surface 36c of the seat 36 will move the seat 36 to the right until the shoulder 36a abuts the spring retainer 58 and fluid flow can proceed from the ports 32 to the ports 30. Because the spring 56 is minimally sized, very little fluid pressure is needed to effect movement in the valve seat 36. Thus, the valve seat construction and mounting serves as a check valve allowing substantially unimpeded fluid flow from the ports 32 to the ports 30.

According to the invention, a secondary or pilot piston 70 is operative to apply a force to the primary piston 34 that urges it towards the left as viewed in FIG. 2. In the preferred embodiment, the secondary piston 70 is constructed in the form of a sleeve that is mounted concentrically with the primary piston 34 and is axially slidable with respect to the piston. A seal ring 71 (similar to the seal ring 42) carried by the piston 34 minimizes fluid leakage between the pilot piston 70 and the primary piston 34. The limits of movement on the piston 70 are determined by a shoulder 72 formed in the valve body bore 40 that marks the transition from a larger to a smaller diameter, and a radial flange 74 formed near the left end of the piston 34. Clearance between the circumferential surface of the flange 74 and the wall of the bore 40 is provided so that the net fluid force, on the flange 74 in the axial direction, is zero. With this configuration, fluid pressure communicated to the spring end of the piston does not apply a fluid force to the larger diameter portion of the primary piston 34 as it did in the prior valve.

A passage 76 is formed in the valve body for communicating pilot pressure from a pilot passage 77 formed in the housing 12 (see FIG. 1) to the secondary piston. Whenever pilot pressure is applied, the piston moves to the left until it abutably contacts the radial flange 74 whereupon it applies a force to the primary piston in opposition to the spring force. Because the area $A_2$ of the secondary piston is substantially larger than the area $A_1$ formed on the primary piston, relatively small pilot pressures can produce substantial forces. For example, if the ratio between the areas $A_2$ and $A_1$ is 4:1 and the relief setting of the valve is 2,000 psi, a pilot pressure of approximately 500 psi will be enough to overcome the spring force and cause movement in the primary piston 34.

In actual operation, the piston 34 will be opened by the combination of forces developed on the areas $A_1$ and $A_2$. In short, the piston 34 will move to the left whenever the sum of the forces on the areas $A_1$ and $A_2$ exceeds the force applied by the biasing spring 44. Essentially, the force applied by pilot pressure via the pilot piston 70 reduces the effective relief setting of the valve thereby causing movement in the piston 34 and the establishment of fluid communication between the ports 30 and the ports 32. It should be remembered that in the embodiment shown, the valve seat 36 is configured to produce a check valve function to allow unimpeded fluid flow from the ports 32 to the ports 30.

The disclosed valve is especially suited for controlling the movement in boom actuators. In this application, the valve is used to lock the actuator in any position once fluid flow is terminated, and further, to prevent boom "runaway" whenever the boom is being lowered. When the boom is being raised, pressurized fluid is directed to the ports 32 and as discussed above, can flow unimpeded to the ports 30 from where it then enters the appropriate actuator chamber (not shown) to cause boom elevation. When the fluid flow is terminated, the seat 36 will immediately re-engage the piston 34 and will prevent fluid flow from the ports 30 to the ports 32 and hence will prevent return flow from the actuator (not shown). The fluid in the actuator will apply a force to the area $A_1$ of the primary piston but as long as it remains below the relief setting will not effect movement in the piston. The relief setting of the valve is generally selected to be higher than the pressure generated by the normally expected boom load. Only an abnormally high boom load will cause movement in the piston. In order to lower the boom, pilot pressure is applied to the pilot piston via the pilot passage 76. The piston will open as soon as the force applied by the pilot piston in combination with the force applied to the area $A_1$ exceeds the spring force and thus allow the return flow of fluid from the actuator through the flow path established by the ports 30, the piston bore 38 and the ports 32. Terminating the pilot pressure will immediately cause the primary piston 34 to reengage the valve seat and prevent further fluid flow from the actuator and thus lock the boom assembly in a new position.

In the illustrated embodiment, the primary piston 34 is "balanced" that is, the net fluid forces on the piston are zero. This configuration in connection with the pilot piston 70 provides a unique pilot assisted pressure relief valve that is not plagued with the problems of the prior art. In applications where substantial system backpressure is encountered (via the ports 32) the relief setting of the valve is not disproportionately increased. As discussed earlier, in the prior valve, system backpressure applied to the spring end of the primary piston would apply a substantial force urging the piston towards its flow interrupting position. In effect, the relief setting of the valve would be increased by a multiple of the system backpressure, the multiple being determined by the ratio of the pilot and relief effective areas (corresponding to $A_1$ and $A_2$ in the present valve).

In the present invention the unique balanced piston construction coupled with the uni-directional action of the pilot piston obviates this problem. Any system backpressure encountered will act directly against the pilot piston and increase the pilot pressure necessary to effect piston movement but will not disproportionately increase the relief setting of the valve.

Although the invention has been described with a certain degree of particularity, it is understood that various changes and modifications can be made to it by those skilled in the art without departing from the spirit or scope of the invention as described and hereinafter claimed.

I claim:

1. A control valve comprising:
(a) a valve body defining a first and a second plurality of circumferentially spaced, radially directed ports, and a stepped internal bore;
(b) an annular, elongated primary piston slidably supported within said stepped bore, said piston including a through bore;
(c) a valve seat engageable with one end of said piston for controlling the fluid communication between the first plurality of ports and the piston bore;
(d) biasing means acting between said valve body and said piston for urging said piston towards its flow interrupting position;
(e) the one end of said piston further defining an effective pressure area such that any fluid pressure present at the first plurality of ports establishes a fluid force on said effective pressure area which urges the primary piston towards its open position; and,
(f) pilot piston means mounted for relative movement with respect to said primary piston, said pilot piston means engageable with said primary piston upon predetermined movement for applying forces to said primary piston urging it towards its open position and said pilot piston means further operative to prevent a disproportionate increase in a relief setting of the control valve in the event a fluid generated back pressure is communicated to the second plurality of ports.

2. A pilot pressure operated, pressure relief valve assembly, comprising:
(a) a valve body defining a stepped longitudinal bore, a first plurality of radially directed ports that extend from an outer surface into said bore, and a second plurality of radially directed ports spaced from said first plurality;
(b) an elongate tubular, primary piston slidably supported in said bore, said piston including a means for communicating an interior through-bore with the second plurality of ports, said piston including a flow control portion formed at one end engageable with a valve seat mounted in said valve body, said flow control portion defining an effective pressure area exposed to fluid pressure at said first plurality of ports and operable to control the communication of fluid from said first plurality of ports to the interior through-bore of said piston;
(c) biasing means urging said piston towards a flow interrupting position;
(d) pilot pressure operated secondary piston means relatively movable with respect to said primary piston, said secondary piston means engageable with an abutment on said primary piston, and operable to exert forces on said piston in opposition to the forces applied by said biasing means to said primary piston and further operable to prevent a disproportionate increase in a relief setting in the valve assembly in the event a fluid generated back pressure is communicated to the second plurality of ports.

3. A control valve comprising:
(a) a valve body defining spaced, first and second port means, each of said port means communicating a longitudinal bore formed in said valve housing with an outside surface of said body;
(b) primary piston means slidably supported in said bore;
(c) a valve seat disposed in said valve body, engageable with one end of said piston, said piston and valve seat controlling the fluid communication from the first port means to the second port means, the one end of said piston means defining an effective pressure area exposed to fluid pressure at said first port means;
(d) biasing means urging the primary piston means towards engagement with said valve seat;
(e) pilot pressure operated secondary piston means relatively movable with respect to said primary piston and engageable with said primary piston upon the application of a predetermined pilot pressure, for applying a force to said primary piston urging it away from said valve seat and said secondary piston further operative to prevent a disproportionate increase in a relief setting of the control valve in the event a fluid back pressure is communicated to the second port means.

4. The valve of claim 3 wherein said secondary piston means comprises a relatively movable sleeve disposed co-axially with said primary piston and includes a radial surface engageable with a radial abutment formed on the primary piston upon a predetermined movement in the secondary piston means.

5. The valve of claim 3 wherein said first and second port means each includes a plurality of circumferentially spaced, radial ports.

6. The valve of claim 3 wherein said valve seat is spring biased towards engagement with said piston and is fluid biased towards engagement by fluid pressure at said first port means.

7. A control valve comprising:
(a) a valve body defining a bore and spaced ports, each of said ports extending from the bore to establish communication with structure external to said body;
(b) primary piston moveably disposed in said bore;
(c) the valve including structure forming a valve seat which when in use is in fluid communication with the valve bore, the seat being engageable with a surface of the primary piston, said primary piston and valve seat being adapted when in use to control the fluid communication from a first port to a second port, said primary piston surface defining an effective pressure area exposed to fluid pressure when in use near said first port;

(d) biasing means urging the primary piston towards engagement with said valve seat;

(e) back pressure absorption means comprising a pilot pressure actuatable secondary piston, operatively associated with, and relatively movable with respect to, said primary piston for reducing the effect of back pressure otherwise additive to the force of said biasing means to urge the primary piston toward the valve seat.

* * * * *